United States Patent
Edwards, II (10) Patent No.: US 10,279,418 B2
(45) Date of Patent: May 7, 2019

(54) METHOD AND APPARATUS FOR RESISTIVE SPOT WELDING

(71) Applicant: Honda Motor Co., Ltd., Minato-ku, Tokyo (JP)

(72) Inventor: Paul C. Edwards, II, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 1144 days.

(21) Appl. No.: 14/333,064

(22) Filed: Jul. 16, 2014

(65) Prior Publication Data

US 2016/0016252 A1   Jan. 21, 2016

(51) Int. Cl.
   *B23K 11/24*   (2006.01)
   *B23K 11/11*   (2006.01)

(52) U.S. Cl.
   CPC ............. *B23K 11/24* (2013.01); *B23K 11/115* (2013.01)

(58) Field of Classification Search
   CPC ............................ B23K 11/115; B23K 11/24
   USPC ................ 219/86.1, 86.33, 86.41, 91.1, 91.2
   See application file for complete search history.

(56) References Cited

U.S. PATENT DOCUMENTS

| | | | |
|---|---|---|---|
| 1,669,126 A | 5/1928 | Hopp | |
| 1,900,161 A * | 3/1933 | Cohan | B23K 11/115 219/91.23 |
| 1,933,484 A | 10/1933 | Ragsdale | |
| 2,250,617 A | 7/1941 | Argentin | |
| 4,048,463 A | 9/1977 | Bennett et al. | |
| 5,302,797 A | 4/1994 | Yasuyama et al. | |
| 5,405,075 A | 4/1995 | Narita et al. | |
| 5,484,975 A | 1/1996 | Itatsu | |
| 5,582,747 A | 12/1996 | Sakai et al. | |
| 5,783,794 A | 7/1998 | Oikawa et al. | |
| 6,064,029 A | 5/2000 | Choi et al. | |
| 8,058,584 B2 | 11/2011 | Miyamoto et al. | |
| 8,502,105 B2 | 8/2013 | Tanaka et al. | |
| 8,541,110 B2 | 9/2013 | Chen et al. | |
| 8,835,795 B2 * | 9/2014 | Buse | B23K 11/11 219/104 |
| 2011/0036816 A1 | 2/2011 | Hou | |
| 2011/0097594 A1 | 4/2011 | Tanaka et al. | |

(Continued)

FOREIGN PATENT DOCUMENTS

WO  2010140605   9/2010
WO  2012033040   3/2012
(Continued)

*Primary Examiner* — Michael G Hoang
(74) *Attorney, Agent, or Firm* — Arent Fox LLP (57) ABSTRACT

An apparatus and corresponding methods are disclosed to resistively spot weld a stack of sheet metal having a plurality of sheets of sheet metal. In one embodiment, a method includes contacting a first welding tip to a first side of the stack and contacting a second welding tip to a second side of the stack, the second side comprising a thinnest exterior sheet of the stack, the second welding tip including a contacting surface area less than the first welding tip; applying a squeeze pressure to the stack; and applying a current to the stack by applying a first current pulse for a first duration followed by applying a second current pulse for a second duration longer than the first duration and with a lower current than a current of the first current pulse.

11 Claims, 6 Drawing Sheets

(56) References Cited

U.S. PATENT DOCUMENTS

| | | | |
|---|---|---|---|
| 2012/0193331 A1* | 8/2012 | Carlson | B23K 11/115 |
| | | | 219/91.2 |
| 2013/0037525 A1 | 2/2013 | Tanaka | |
| 2013/0037528 A1 | 2/2013 | Ogake | |
| 2013/0087533 A1 | 4/2013 | Hou | |
| 2013/0189023 A1 | 7/2013 | Spinella | |
| 2014/0367368 A1* | 12/2014 | Yang | B23K 11/0033 |
| | | | 219/91.22 |

FOREIGN PATENT DOCUMENTS

| | | |
|---|---|---|
| WO | 2012043587 | 5/2012 |
| WO | 2013172202 | 11/2013 |

\* cited by examiner

METHOD AND APPARATUS FOR RESISTIVE SPOT WELDING

BACKGROUND

The subject matter disclosed herein relates to methods and corresponding apparatus for resistive spot welding.

Resistive spot welding is commonly understood as a process to couple multiple metal workpieces or sheets by heating the metal sheets. A circuit is created through the metal sheets and a high current is applied thereto, which current interacts with the resistances of the metal sheets to create heat. This heat in turn melts, fuses, or welds the metal sheets together. Resistive spot welding is widely used in various industries that utilize metal workpieces or sheets. For example, resistive spot welding is utilized to manufacture automobiles.

Using certain traditional spot welding technologies and methodologies, welding four or more sheets of sheet metal together may be difficult to achieve with high reliability. Similarly, welding stacks of sheet metal having a stack ratio of seven or higher with these conventional welding technologies and methodologies cannot be achieved with high reliability. Current attempts to use traditional resistive spot welding technologies in such applications have yielded welds that are not suitable for structural use (e.g., to hold panels or pieces together with welds strong enough to, for example, pass crash-test requirements).

There are some high stack ratio welding devices in existence today. However, though suitable for some purposes, such devices do not necessarily meet the needs of all application settings and/or users. For example, these high stack ratio welding devices may be devices utilized specifically and exclusively for such applications. They may require multiple welding tips per side and other various specialized parts and controllers. Such devices, when compared to other traditional equipment such as standard servo-gun style spot welders, are often more expensive and less flexible in their configurations and applications. Thus, an economic and flexible solution is desirable.

SUMMARY

According to one aspect, a method includes contacting a first welding tip to a first side of a stack of sheet metal including a plurality of sheets of sheet metal. The method also includes contacting a second welding tip to a second side of the stack of sheet metal, the second welding tip including a contacting surface area less than a contacting surface area of the first welding tip, the second side of the stack of sheet metal including a thinnest exterior sheet of the stack of sheet metal. The method further includes applying a squeeze pressure to the stack of sheet metal between the first welding tip and the second welding tip, and applying a current to the stack of sheet metal between the first welding tip and the second welding tip to resistively spot weld the stack of sheet metal. Applying the current comprises applying a first current pulse for a first duration followed by applying a second current pulse for a second duration longer than the first duration, the second current pulse having a lower current than a current of the first current pulse.

In another aspect, an apparatus includes a servo-gun resistive spot welding device comprising a first welding tip configured to contact a first side of a stack of sheet metal, the stack of sheet metal including a plurality of sheets of sheet metal. The servo-gun resistive spot welding device also comprises a second welding tip configured to contact a second side of the stack of sheet metal, the second welding tip including a contacting surface area less than a contacting surface area of the first welding tip, the second side of the stack of sheet metal including a thinnest exterior sheet of the stack of sheet metal, the first welding tip and the second welding tip applying a squeeze pressure and a current to the stack of sheet metal therebetween to resistively spot weld the stack of sheet metal. The apparatus also comprises a controller coupled in signal communication with the servo-gun resistive spot welding device to, at least in part, effect application of the current to the stack of sheet metal, the controller configured to effect application of a first current pulse for a first duration; and effect application of a second current pulse at a second duration longer than the first duration, wherein the second current pulse is applied following the application of the first current pulse.

In yet another aspect, a method of resistively spot welding a stack of sheet metal, wherein the stack of sheet metal includes at least four individual sheets of sheet metal and having a stack ratio of seven or higher, includes applying a squeeze force to the stack of sheet metal positioned between a first welding tip and a second welding tip, wherein the second welding tip has a contact surface area greater than a contact surface area of the first welding tip, and the second welding tip is in direct contact with a thinnest exterior sheet of the stack of sheet metal. The method also includes applying a direct current to the stack of sheet metal positioned between the first welding tip and the second welding tip, the first welding tip has a negative polarity and the second welding tip has a positive polarity, wherein applying the direct current to the stack of sheet metal comprises applying a first current pulse for a first duration followed by applying a second current pulse for a second duration at least five times greater than the first duration. The method further includes dressing the first welding tip and the second welding tip after performing between 80 welding operations and 160 welding operations.

The embodiments disclosed herein are not intended to limit or define the full capabilities of the device. It is assumed that the drawings and depictions constitute exemplary embodiments of the many embodiments of the device and methods.

DETAILED DESCRIPTION

Figure 1:
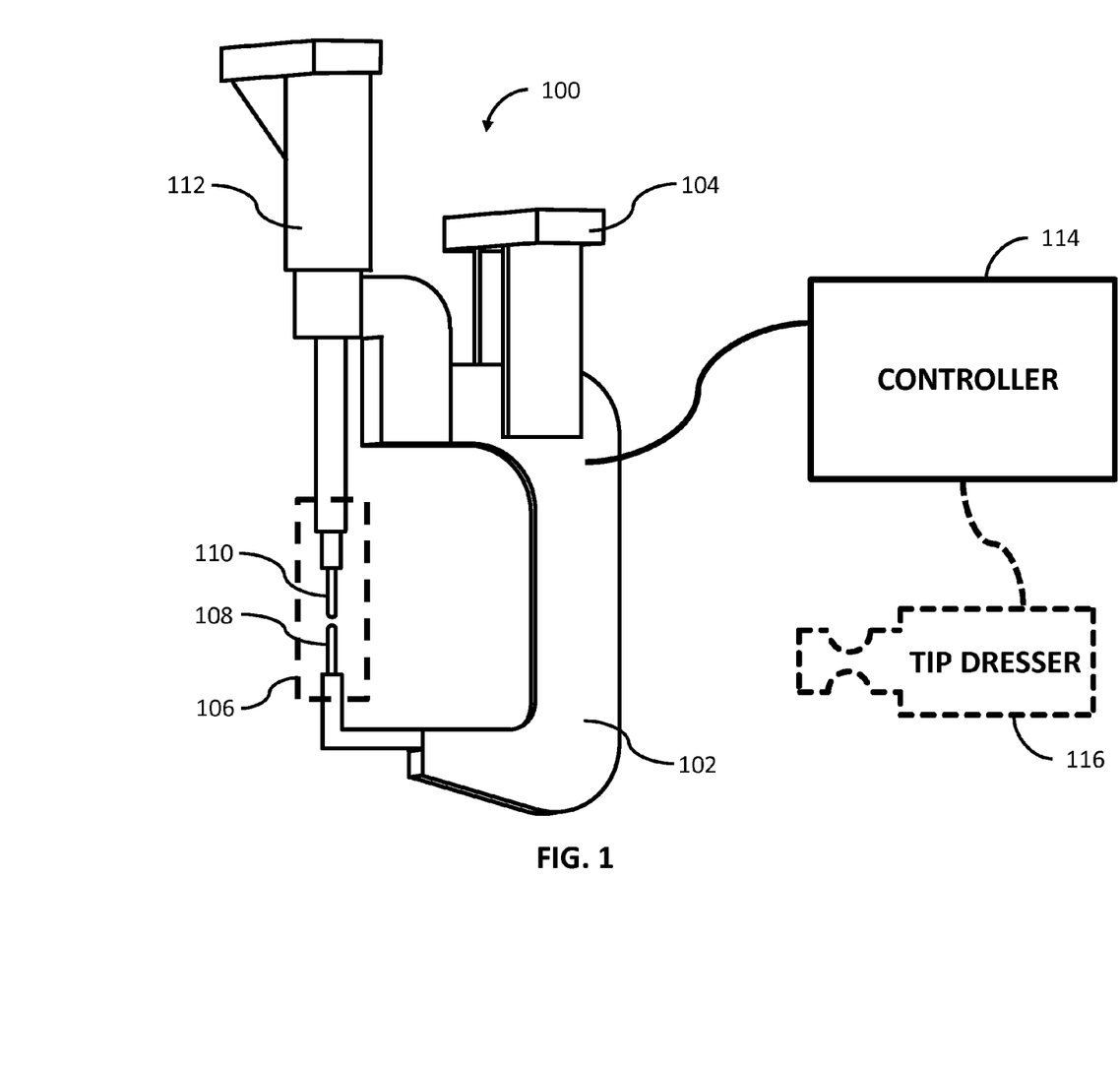
FIG. 1 is an exemplary resistive spot welding device in accordance with various embodiments.

Referring now to the figures, FIG. 1 illustrates an exemplary resistive spot welding device 100. The resistive spot welding device 100 includes a frame 102 which can be mounted to a robotic arm (not shown) at one or more mounting locations 104. The resistive spot welding device 100 also includes a pair of welding tips 106 that includes a first welding tip 108 and a second welding tip 110. The frame 102 and the welding tips 106 are configured such that metal components or stacks of sheet metal can be inserted between the welding tips 106. The welding tips 106 are aligned in opposing directions but pointing toward one another. Typically, though not always, the welding tips 106 are constructed of low-resistance metal (such as copper or other metals) and are cooled by water flowing through the tips 106 (or by other means known in the art).

In some embodiments, one welding tip (the second welding tip 110 in this example) is actuated by an actuator 112 to move away from and toward the other tip (the first welding tip 108 in this example) in a linear fashion. In other embodiments, both welding tips 108, 110 are actuated to move apart and toward each other in a linear fashion. Other embodiments employ a lever movement function to rotate one or both of the welding tips 106 about one or more pivot axis, which action can be similarly effected by an actuator 112. Various types of actuators 112 may be utilized to move the welding tips 106 and to apply a squeeze pressure between the welding tips 106. In some embodiments, the actuator 112 is a pneumatic actuator. In other embodiments, the actuator 112 is a servo actuator, making the resistive spot welding device 100 a servo-gun spot welding device. Servo-gun spot welding devices, though typically more expensive than their pneumatic counterparts, are generally more precise in their movements and their application of squeeze pressure, making their use particularly valuable in the automotive industry.

As shown in FIG. 1, a controller 114 is coupled to or integrated with the resistive spot welding device 100. The controller 114 may control various aspects of the welding operations, including positioning (possibly via or in combination with control of one or more robotic arms), actuator control, and current application. The controller 114 may also receive various feedback signals from the resistive spot welding device 100 which may then be recorded or utilized by the controller 114 to adjust certain parameters. The controller 114 may be part of a larger control network, such as a network that may control the functions of a collection of machines, an assembly line, or an entire factory. The controller 114 may include one or more processing devices that are configured to effect the various operations of the resistive spot welding device 100, including effecting application of a squeeze pressure or application of a direct current to a stack of sheet metal by the first welding tip 108 and the second welding tip 110. The controller 114 may be configurable via programming (firmware, software, programmable logic device, or other known methodologies) or via control software that may be executed remotely from the controller 114. In an alternative embodiment, a tip dresser 116 (such as an automated tip dresser apparatus as is known in the art) is communicatively coupled to the controller 114 to be controlled, at least in part, by or in conjunction with the controller 114.

Figure 2:
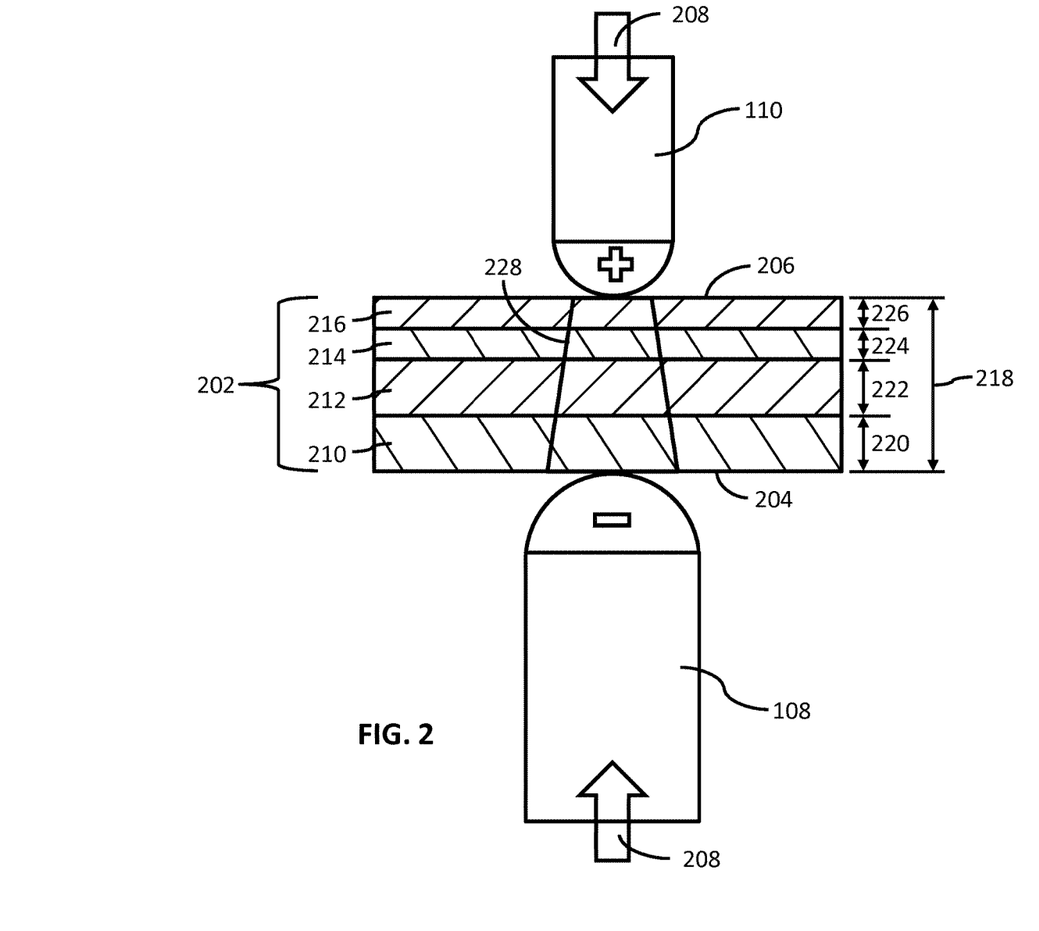
FIG. 2 is a detailed view of a resistive spot welding application in accordance with various embodiments.

Turning now to FIG. 2, a detailed view of a resistive spot welding application is illustrated in accordance with various embodiments. In one embodiment, the first welding tip 108 and the second welding tip 110 contact opposite sides of a stack of sheet metal 202. The first welding tip 108 contacts a first side 204 of the stack of sheet metal 202 and the second welding tip 110 contacts a second side 206 of the stack of sheet metal 202. A squeeze pressure 208 (or squeeze force 208) is applied by the actuator 112 to the stack of sheet metal 202 positioned between the first welding tip 108 and the second welding tip 110. Typically, the squeeze pressure 208 is measured in kilograms-force (kgF) and, in certain embodiments, the squeeze pressure 208 is between 20 kgF to 2,000 kgF. A squeeze pressure 208 between 200-700 kgF or between 200-500 kgF is more commonly utilized, while other approaches utilize a narrower range of 300-400 kgF. In some embodiments describe herein, a squeeze pressure of 350 kgF is applied, though other specific squeeze pressure 208 values within the ranges described may be suitable for various applications. All squeeze pressure 208 ranges and values are provided with a ±10% variance, though other variances may be appropriate in various settings.

Upon application of the squeeze pressure 208, a welding procedure can be initiated. While the squeeze pressure 208 is maintained (though, in some embodiments, the squeeze pressure 208 can increase or decrease during the welding procedure), a direct current is applied to the stack of sheet metal 202 positioned between the first welding tip 108 and the second welding tip 110. The application of the direct current to the stack of sheet metal 202 creates heat through interaction with the resistance of the sheet metal. This heat melts or fuses the individual sheets within the stack of sheet metal 202 to resistively spot weld the stack of sheet metal 202. The direct current is typically applied for only a fraction of a second and with a current in the kilo-amps range. The direct current is often created by a medium-frequency direct current (MFDC) technique, though other direct current schemes may be suitable in various application settings. As shown in FIG. 2, the first welding tip 108 has a negative polarity, while the second welding tip 110 has a positive polarity. By this, the direct current may flow from the second welding tip 110 toward the first welding tip 108 through the stack of sheet metal 202. A short time after cessation of the application of the direct current, the squeeze pressure 208 may be removed and the resistive spot weld is completed.

In standard prior art resistive spot welding applications, a resistive spot weld is very hard to achieve with certain configurations of material within a stack of sheet metal. Further, resistive spot welds are nearly impossible to achieve with any sort of reliability that is suitable for structural applications (for example, a frame of an automobile) or suitable for mass manufacturing in certain configurations of material within the stack of sheet metal. For example, as the number of sheets within a stack of sheet metal increases, the cost to control production increases exponentially. Particularly, it has been determined that welding a stack of sheet metal containing four or more individual sheets of sheet metal with reliability is not possible with prior art methodologies. Further, it has been determined that welding a stack of sheet metal having a stack ratio (described below) of seven or higher with reliability is not possible with prior art methodologies.

With continuing reference to FIG. 2, an exemplary stack of sheet metal 202 is shown in accordance with various embodiments. In this embodiment, the stack of sheet metal 202 includes at least four individual sheets of sheet metal: a first sheet 210 defining the first side 204 of the stack of sheet metal 202, a second sheet 212 adjacent to the first sheet 210, a third sheet 214 adjacent to the second sheet 212, and a fourth sheet 216 adjacent to the third sheet 214 and defining the second side 206 of the stack of sheet metal 202. Though four individual sheets of sheet metal are illustrated and described herein, these teachings can be readily applied to stacks of sheet metal 202 having more than four individual sheets, including five sheets, six sheets, seven sheets, or an even higher or lower number of sheets. As illustrated in FIG. 2, the stack of sheet metal 202 has a total thickness 218, and the individual sheets may have the same thickness or one or more of the individual sheets may have a thickness different than a thickness of one or more of the other individual sheets, according to the specific application. For example, the first sheet 210 has a first sheet thickness 220, the second sheet 212 has a second sheet thickness 222, the third sheet 214 has a third sheet thickness 224, and the fourth sheet 216 has a fourth sheet thickness 226.

A stack ratio (also called a thickness ratio) is a ratio of the total thickness 218 of the stack of sheet metal 202 over a thickness of the thinnest exterior sheet of sheet metal of the stack of sheet metal 202. In this example, the fourth sheet 216 (which defines the second side 206 of the stack of sheet metal 202) is the thinnest exterior sheet having the fourth sheet thickness 226. Thus, the stack ratio in this example is the total thickness 218/the fourth sheet thickness 226. Resistively spot welding a stack of sheet metal having a stack ratio of seven or higher has been regarded as very difficult. This is explained with respect to FIG. 3.

Figure 3:
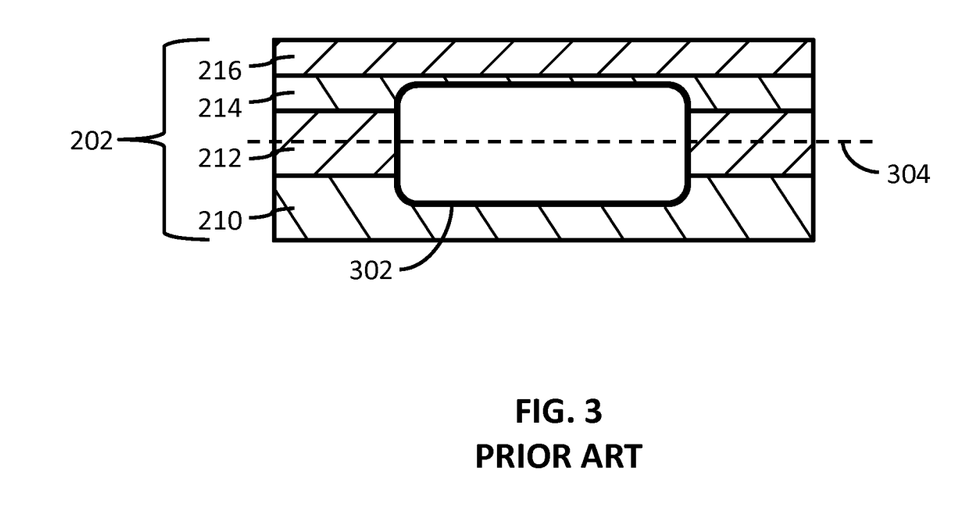
FIG. 3 is a prior art example of a resistive spot welding procedure in accordance with prior art methodologies.

Turning briefly to FIG. 3, a prior art example of a resistive spot welding procedure is illustrated in accordance with prior art methodologies. Typically, a direct current is applied to the stack of sheet metal 202 in a single square-wave fashion (on-then-off) for a set amount of time (a fraction of a second). A welding nugget 302 will form near a center of mass 304 of the stack of sheet metal 202 (being the middle of the thickness of the stack of sheet metal 202). Additionally, thicker sheet metals, for example, the first sheet 210 and the second sheet 212, are typically made from less conductive metals than thinner sheet metals, for example, the third sheet 214 and the fourth sheet 216. For example, thicker sheets 210, 212 are often made of dual-phase steel, precipitation strengthened steel, boron-strengthened steel (for example, USIBOR® 1500P steel), and other steels of lesser conductivity. Comparatively, thinner sheets 214, 216 often do not have a requirement to be "skin rated" so that they can remain in forms that are typically more conductive. Because thicker sheets 210, 212 are often less conductive (meaning, having more electrical resistance), they will produce more heat to form the welding nugget 302 than the thinner sheets 214, 216 when the direct current is applied. This serves to move the initial formation location of the welding nugget 302 away from the center of mass 304 in a direction away from the fourth sheet 216 (being the thinnest exterior sheet). This makes forming a welding nugget 302 in the fourth sheet 216 even harder.

Because the formation of the welding nugget 302 occurs at a relatively large vertical distance from the fourth sheet 216, it is very hard to grow the welding nugget 302 large enough to involve the fourth sheet 216, as is illustrated in FIG. 3. This is particularly difficult because a welding nugget 302 typically grows outward (in a direction parallel with the planes of the sheets of metal) quicker than upward and downward (in a direction generally perpendicular to the plans of the sheets of metal, being a direction between the first welding tip 108 and the second welding tip 110). This is because, in part, the hotter metal of the welding nugget 302 will have a higher resistance than a resistance of the cooler metal of the other sheets, and thus will result in additional heat production efficiency as compared to the cooler non-liquefied metal sheet layers. As a result, a majority of the heat forms from within the welding nugget 302 and grows outward along a solid layer of sheet metal much easier than the welding nugget will grow by crossing sheet interfaces to jump between sheet metal layers. The upward/downward growth is also stunted by the fact that the first welding tip 108 and the second welding tip 110 are cooled (typically by internally flowing water) so that the welding tips will act to cool the outer sheets (the first sheet 210 and the fourth sheet 216) where they contact, and particularly the thinnest outer sheet 216. This keeps the resistivity of the outer sheets down (which reduces resistance-based heat generation efficiency of the exterior sheets 210, 216) and thermally stunts welding nugget 302 formation in or growth into the exterior sheets 210, 216 (because the cooling action counteracts any melting of the exterior sheets 210, 216 into the welding nugget 302).

Additional time and higher currents are required to grow the welding nugget 302 to a size that will involve the fourth sheet 216, if possible at all. However, the simple addition of time and current usually results in spatter, which is the rapid exodus of metal from the welding nugget 302 (typically seen as sparks emanating from the welding point). Spatter occurs quickly as the welding nugget 302 grows outward to regions that are less directly subjected to the squeeze pressure 208 between the first and second welding tips 108, 110. At this point, the heated metal escapes out of the gaps between the sheets in the form of spatter. Because metal will have exited the welding nugget during spatter, the resulting weld will have decreased strength or will become a failed weld (such as a void where the entire welding nugget 302 has melted and exited), which may even compromise the entire structure of which the weld is a part. Accordingly, prior art methodologies result in either an incomplete weld as illustrated in FIG. 3, or result in a deteriorated or failed weld when using four or more sheets and/or a stack ratio of seven or higher.

Returning now to FIG. 2, according to one embodiment, a stack of sheet metal 202 having a plurality of individual sheets of sheet metal (at least four individual sheets of sheet metal in one embodiment) and a stack ratio of seven or higher can be reliably resistively spot welded. In this embodiment, the thinnest exterior sheet, being the fourth sheet 216 defining the second side 206 of the stack 202, is directly contacted by the second welding tip 110. Similarly, the other exterior sheet, being the first sheet 210 defining the first side 204 of the stack 202, is directly contacted by the first welding tip 108. The second welding tip 110 has a contacting surface area less than a contacting surface area of the first welding tip 108. In this embodiment, spherical welding tips are used, however, other welding tip styles may be used as well, including ball-shaped, conical, rounded, pointed, or other known welding tip types. Typically, the larger or wider the welding tip, the greater the surface area. In some instances with spherical welding tips (or other rounded welding tips), as the welding tips 108, 110 are pressed into the stack of sheet metal 202 by the squeeze pressure 208, the individual sheets of sheet metal, and particularly the exterior sheets (the first sheet 210 and the fourth sheet 216) will bend and indent slightly to conform, at least in part, to the rounded shape of the spherical welding tip. (This is better illustrated in FIG. 6, being a real-world resulting weld of the disclosed embodiment.) Thus, the larger welding tip (the first welding tip 108 in this embodiment) will have a larger contacting surface area than a contacting surface area of the smaller welding tip (the second welding tip 110 in this embodiment). In certain embodiments, as is understood in the art, the welding tips 108, 110 include "faces" or "flats" that have particular diameters (e.g., 6 millimeters, 7 millimeters, 8 millimeters, or other sizes). However, in some embodiments (for example, embodiments utilizing spherical welding tips), the faces or flats are not flat, but are spherical with a spherical radius (for example, 40 millimeters). The spherical radius can improve angular tolerance of the welding tips. In some embodiments a tip ratio of 6 over 8 is used (e.g., the smaller welding tip having a face of 6 millimeters and the larger welding tip having a face of 8 millimeters), while in other embodiments a tip ratio of 7 over 8 is used (e.g., the smaller welding tip having a face of 7 millimeters and the larger welding tip having a face of 8 millimeters), though other tip ratios may be suitable for certain applications and are contemplated by this disclosure.

As the direct current is applied to the stack of sheet metal 202 by the first and second welding tips 108, 110, the current will flow through the stack of sheet metal 202 with a higher current density near the second welding tip 110 than the current density near the first welding tip 108. This is because the second welding tip 110 has a smaller contacting surface area than the contacting surface area of the first welding tip 108. This differing current density is represented as a trapezoidal current density 228 in the cross-sectional view illustrated in FIG. 2 (relating to the cross-section of a three dimensional conical or frustum shape). The higher current density near the second welding tip 110 acts to counteract the decreased resistance often present in thinner sheets (such as the third and fourth sheets 214, 216). This is because the higher current density results in a higher temperature at that location as more current is flowing through a smaller surface area than in areas with a lower current density. If the temperature is high enough due to the higher current density, a welding nugget may be formed closer to the second welding tip 110 than to the first welding tip 108 (which is opposite to the natural tendencies of the welding nugget to be formed further from the second welding tip 100, where the thinnest exterior sheet exists).

In some embodiments, a tip dressing procedure may be performed with regular or semi-regular frequency, or as needed. In one embodiment, the tip dressing procedure is performed by a trip dresser 116 coupled to the controller 114. After a number of welding procedures, a contact area of a welding tip may grow (or "mushroom") to a larger size (e.g., formation of a "weld cap mushroom"). Tip dressing procedures are well known in the art and may involve the in-place removal of the weld cap mushroom to re-face the welding tips to the desired shape. This improves welding accuracy, weld quality, and reduction of weld spatter. Further, in maintaining desired specified welding tip contacting surface areas, as described above, the current density profile 228 can be maintained such that the location of formation of the first welding nugget 412 can be managed more accurately. In one embodiment, a tip dressing procedure is performed on the first welding tip 108 and the second welding tip 110 after performing between 40 welding operations and 200 welding operations, or after performing between 80 welding operations and 160 welding operations, or after performing between 100 welding operations and 140 welding operations, or after performing 120 welding procedures.

Figure 4:
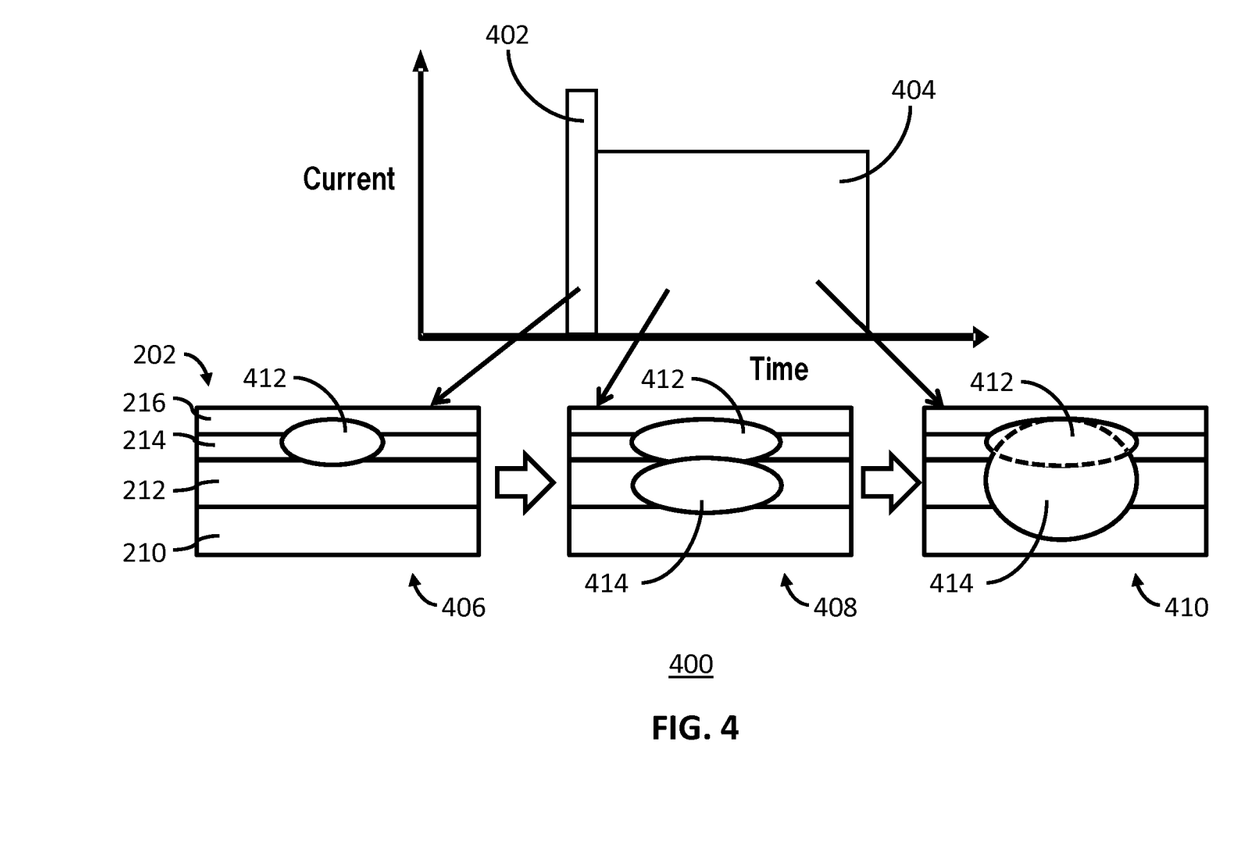
FIG. 4 is an exemplary current profile and a resulting welding nugget formation and growth in accordance with various embodiments.

Turning now to FIG. 4, a first current profile 400 is described according to various embodiments to advantageously utilize the disclosed differing current density created by the disparate welding tip contacting surface areas. The current profile 400 represents the application of current to the stack of sheet metal 202 by the first and second welding tips 108, 110. As noted before, the controller 114 may effect the application of the current profile 400 (and current profile 500 discussed below). The current profile 400 is illustrated with time in the horizontal axis and a current value in the vertical axis. After application of the squeeze pressure 208 (not illustrated in FIG. 4), a first current pulse 402 is applied, which is followed (immediately thereafter or after a pause) by a longer second current pulse 404. After the second current pulse 404 has ceased, the squeeze pressure 208 can be removed and the spot welding procedure is completed. The second current pulse 404 is applied with a lower current value than a current value applied during the first current pulse 402. In some embodiments, the first current pulse 402 is applied with greater-than-normal current. This greater-than-normal current is a current value that would not typically otherwise be applied to a stack of sheet metal 202 having certain configurations and attributes as its application thereto would more likely result in spatter or a defective weld rather than a proper weld if it was applied for a length of time that would be required to weld the stack of sheet metal 202. It should be noted that multiple second current pulses 404 may be applied (for example, two, three, four, five, or more second current pulses 404), which multiple second current pulses 404 are contemplated by this disclosure.

A first stage 406, a second stage 408, and a third stage 410 are shown in FIG. 4 illustrating generally the formation of welding nuggets in connection with the disclosed current profile 400. As is shown in the first stage 406, which represents a cross-section of the stack of sheet metal 202 during or at the completion of application of the first current pulse 402, a first welding nugget 412 will begin to be formed closer to the second welding tip 110 (which is in contact with the fourth sheet 216, see FIG. 2). In this embodiment, the first welding nugget 412 forms at or near an interface between the third sheet 214 and the fourth sheet 216. The first welding nugget 412 forms here because the higher current value of the first current pulse 402 combined with the higher current density at that location creates a greater heat density nearer to the fourth sheet 216. This in turn melts the metal of the third sheet 214 and the fourth sheet 216 to form the first welding nugget 412 prior to, or simultaneously with, melting of the first sheet 210 and/or the second sheet 212. The greater-than-normal current of the first current pulse 402 cannot be maintained for very long as it will quickly and uncontrollably result in spatter and a failed weld.

After the first current pulse 402 is applied, the second current pulse 404 is applied (immediately thereafter or after a pause). The second current pulse 404 is applied for a longer duration than a duration of the first current pulse 402 (at least five times longer in certain embodiments) and with a current value less than a current value of the first current pulse 402. As shown in FIG. 4, the second stage 408 represents a cross-section of the stack of sheet metal 202. During application of the second current pulse 404, a second welding nugget 414 forms and grows per usual welding techniques as described above. Although the second welding nugget 414 is not illustrated in the first stage 406, in certain embodiments, the initiation of the second welding nugget 414 may occur slightly after or nearly simultaneously with formation of the first welding nugget 412 during the first current pulse 402. During the second stage 408, the first welding nugget 412 and the second welding nugget 414 will continue to grow. In the third stage 410, which represents a cross-section of the stack of sheet metal 202 during a later segment of or at the completion of application of the second current pulse 404, the first welding nugget 412 may discontinue to grow while the larger second welding nugget 414 may continue to grow at a slower and more controlled rate with greater consistency. By this, the second welding nugget 414 may envelop or join with the first welding nugget 412. The result is a solid and complete resistive spot welding nugget (a combination of the first welding nugget 412 and the second welding nugget 414) that incorporates all four sheets 210, 212, 214, and 216 within the stack of sheet metal 202.

Figure 5:
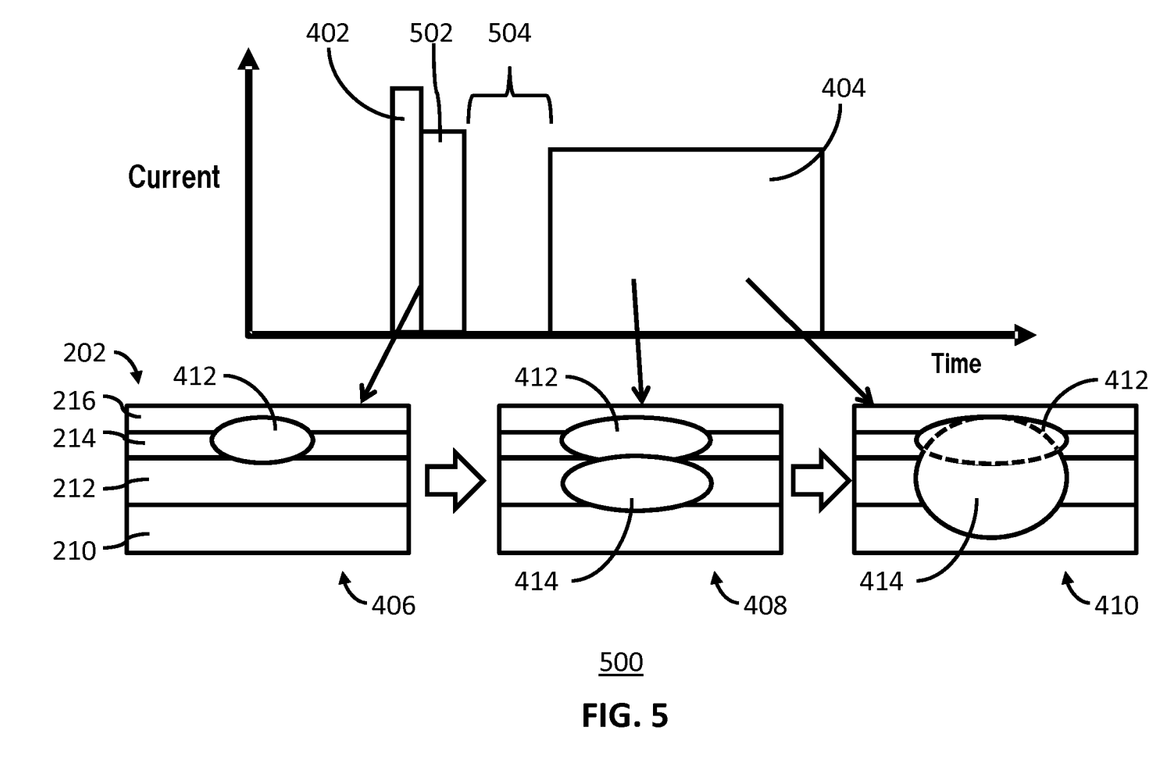
FIG. 5 is another exemplary current profile and a resulting welding nugget formation and growth in accordance with various embodiments.

Turning now to FIG. 5, an alternative current profile 500 is illustrated in accordance with various embodiments. The alternative current profile 500 may be better suited to accommodate certain various configurations of stacks of sheet metal 202 than the current profile 400 of FIG. 4. Examples of various configurations are described in greater detail below. Like the current profile 400 of FIG. 4, the current profile 500 of FIG. 5 is illustrated with time in the horizontal axis and a current value in the vertical axis. The current profile 500 includes the first current pulse 402, which is followed (in one embodiment, immediately, though possibly after a pause) with an intermediate current pulse 502. In certain embodiments, the intermediate current pulse 502 has a lower current value than a current value of the first current pulse 402, but in other embodiments, have a higher current value. In some embodiments, the intermediate current pulse 502 may be a current value approximately equal to the current value of the second current pulse 404, while in other embodiments it may be higher or lower than the current value of the second current pulse 404. The intermediate current pulse 502 is typically, though not necessarily, applied for a slightly longer duration than the first current pulse 402 (e.g., one cycle longer), but still a shorter duration than application of the second current pulse 404. It should be understood that although one intermediate current pulse 502 is described herein, multiple intermediate current pulses (for example, two, three, four, five, or more intermediate current pulses) may be utilized in certain applications, which additional intermediate current pulses are contemplated by this disclosure.

In certain embodiments, the current profile 500 includes waiting a period of cooling time 504 after applying the first current pulse 402 and/or the intermediate current pulse 502. After this period of cooling time 504 has elapsed, the second current pulse 404 is applied. It should be noted that the period of cooling time 504 may also be utilized in variations of the current profile 400 illustrated in FIG. 4 (for example, after the first current pulse 402 and before the second current pulse 404), and more than one periods of cooling time 504 may be utilized in various applications. By this, in both current profiles 400 and 500, each of the first current pulse 402, the intermediate current pulse 502, and the second current pulse 404 are distinguishable from each other in one or more of the following: a current value, a duration of application, by a gap in time between their applications (e.g., the period of cooling time 504) or a combination thereof.

Like the current profile 400 of FIG. 4, the current profile 500 is configured to initiate formation and growth of the first welding nugget 412 at or near the interface between the third sheet 214 and the fourth sheet 216. By adding the intermediate current pulse 502, having a lower current than the first current pulse 402, heat can continue to be focused at or near the first welding nugget 412, but in a controlled manner. By this, the first welding nugget 412 can continue to be grown while avoiding or reducing the occurrence of spatter that may otherwise occur if the higher current of the first current pulse 402 were maintained longer. The continued growth of the first welding nugget 412 during application of the intermediate current pulse 502 can be due, at least in part, to the increased resistance of the first welding nuggets compared to the rest of the stack of sheet metal 202, which is in turn due to its relatively hotter state after application of the higher first current pulse 402. The end result after application of the first current pulse and the intermediate current pulse 502 may be similar to that of the current profile 400 of FIG. 4, and thus the first stage 406 result is reproduced in FIG. 5.

In some embodiments, waiting a period of cooling time 504 may be particularly beneficial in the current profile 500 of FIG. 5. The application of greater-than-normal current during at least the first current pulse 402 and uninterrupted application of current during the intermediate current pulse 502 can overheat the first welding nugget 412 (by virtue of either the higher current density and/or the increased resistance due to its already hot state). Continued application of current may result in excessive spatter or other forms of deterioration or failure in the first welding nugget 412 if the first welding nugget 412 is not allowed to at least partially cool. In waiting the period of cooling time 504, the first nugget 412 is allowed to cool and decrease its relative resistance, allowing subsequent applications of current (such as the second current pulse 404) to affect other locations within the stack of sheet metal 202, such as, for example, the location where the second welding nugget 414 forms.

In much the same fashion as the current profile 400 of FIG. 4, the second stage 408 and the third stage 410 represent the first welding nugget 412 and the second welding nugget 414 growth during application of the second current pulse 404. The descriptions above are applicable here, as well.

General timing parameters are described with respect to the current profiles 400 and 500 of FIGS. 4 and 5 in accordance with various embodiments. All times are provided in "cycles," which is a widely used and understood term of art in welding. One "cycle" is equal to 1/60th of one second, or 0.01$\overline{6666}$ seconds. In many applications (though not all applications) the first current pulse 402 is applied for a first duration of two cycles to five cycles, and, in certain embodiments, applied for three cycles. Similarly, in many applications (though not all applications) the intermediate current pulse 502 is applied for a third duration of two cycles to five cycles, and, in certain embodiments, applied for four cycles. In many applications (though not all applications), the period of cooling time 504 spans five cycles to nine cycles, and, in certain embodiments, spans seven cycles. The durations of the first current pulse 402, the intermediate current pulse 502, and the period of cooling time 504 may have a tolerance or variation of ±1 cycle, though other tolerances may be appropriate in certain settings. In many applications (though not all applications), the second current pulse 404 is applied for a second duration of 15 cycles to 50 cycles or, more specifically, for 25 cycles to 35 cycles, or, even more specifically, 29 cycles or 30 cycles. The second duration of the second current pulse 404 has a tolerance or variation of ±10%, though other tolerances may be appropriate in certain settings.

Figure 6:
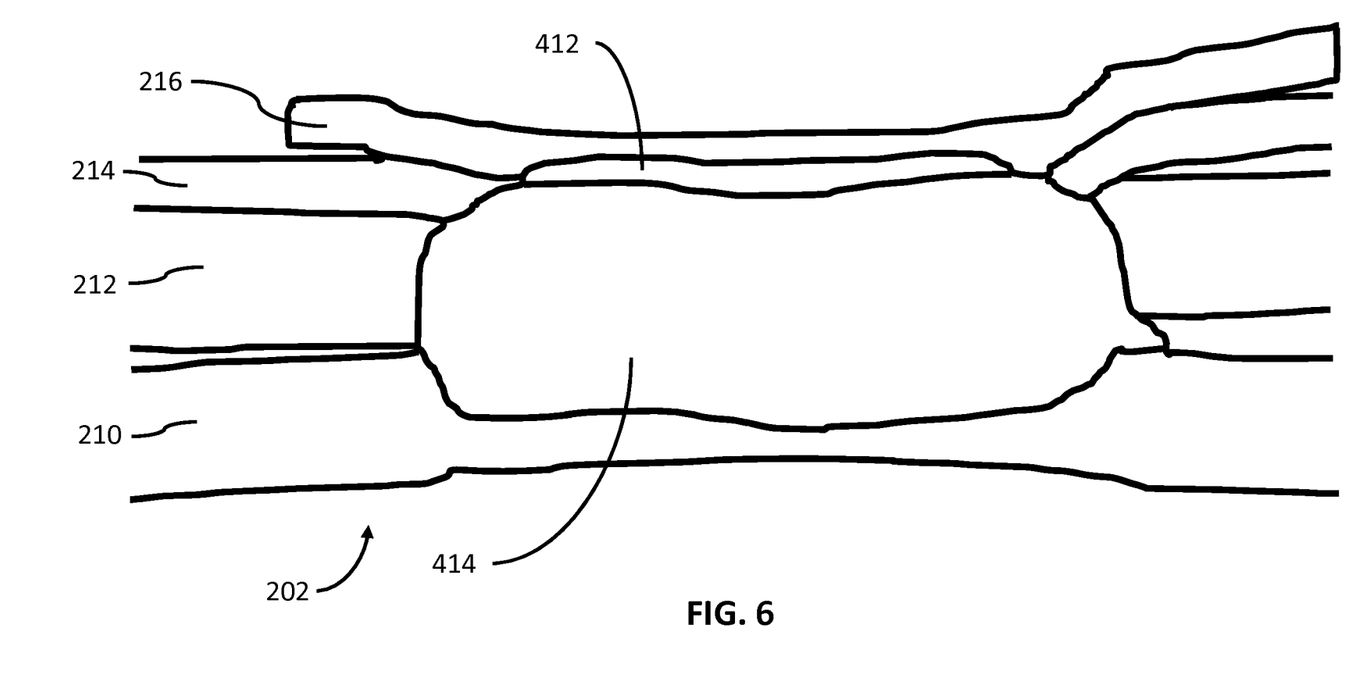
FIG. 6 is an exemplary real-world result of the disclosed high stack ratio resistive spot welding method in accordance with various embodiments.

Turning briefly to FIG. 6, an exemplary result of the disclosed high stack ratio resistive spot welding method is illustrated. The stack of sheet metal 202 includes the first sheet 210 on bottom, the second sheet 212 adjacent to and on top of the first sheet 210, the third sheet 214 adjacent to and on top of the second sheet 212, and the fourth sheet 216 adjacent to and on top of the third sheet 214. The fourth sheet 216 represents the thinnest exterior sheet. It is noteworthy that the exterior sheets (the first sheet 210 and the fourth sheet 214) are indented toward the center of the stack of sheet metal 202 due in part to the squeeze pressure 208 exerted by the welding tips 108, 110. The first welding nugget 412 can be seen between the third sheet 214 and the fourth sheet 216, while the larger second welding nugget 414 can be seen involving at least the first, second, and third sheets 210, 212, 214. The interface between the first welding nugget 412 and the second welding nugget 414 is a very strong bond due to their mutual simultaneous growth into one another, and in some instances, is indistinguishable. In essence, a single welding nugget is formed that involves all four sheets.

With continued reference to FIGS. 4 and 5, various exemplary current profile parameters are described according to various stack configurations and aspects. All times are provided in "cycles" and all current values are provided in kilo-amps (kA), which current values allow for a ±5% tolerance, though other tolerances may be appropriate in certain settings.

In a first example, a stack of sheet metal 202 is configured as follows:

TABLE 1

| Sheet | Thickness (mm) | Approx. Tensile Strength (kPa) | Notes |
|---|---|---|---|
| 4 | 0.6 | 270 | Cold-rolled, non-galvanized, skin rated |
| 3 | 0.6 | 270 | Cold-rolled, galvanized (45 g/m$^2$) |
| 2 | 1.4 | — | Boron-strengthened steel (e.g., USIBOR ® 1500P) |
| 1 | 1.4 | 780 | Cold-rolled, galvanized (60 g/m$^2$) |

In an exemplary application using a stack of sheet metal as configured according to TABLE 1, according to one embodiment, a current profile similar to the current profile 400 of FIG. 4 may be utilized. In this exemplary embodiment, the first current pulse 402 is applied for 3 cycles and has a current value of 10.5 kA and the second current pulse 404 is applied for 29 cycles and has a current value of 9.75 kA. The second current pulse 404 may be applied immediately after application of the first current pulse 402, or after a negligible gap in time.

In another example, a stack of sheet metal 202 is configured as follows:

TABLE 2

| Sheet | Thickness (mm) | Approx. Tensile Strength (kPa) | Notes |
|---|---|---|---|
| 4 | 0.6 | 270 | Cold-rolled, non-galvanized |
| 3 | 0.6 | 270 | Cold-rolled, galvanized (45 g/m$^2$), non-skin rated |
| 2 | 1.4 | — | Boron-strengthened steel (e.g., USIBOR ® 1500P) |
| 1 | 1.6 | 980 | Cold-rolled, galvanized, dual-phase steel |

In an exemplary application using a stack of sheet metal as configured according to TABLE 2 and/or TABLE 1 (as an alternative), according to one embodiment, a current profile similar to the current profile 500 of FIG. 5 is utilized. In this exemplary embodiment, the first current pulse 402 is applied for 3 cycles and has a current value of 10.5 kA. The intermediate current pulse 502 is applied for 4 cycles and has a current value of 9.0 kA. A period of cooling time 504 lasts 7 cycles (where no current is applied). The second current pulse 404 is applied for 30 cycles and has a current value of 9.0 kA.

In another example, a stack of sheet metal 202 is configured as follows:

TABLE 3

| Sheet | Thickness (mm) | Approx. Tensile Strength (kPa) | Notes |
|---|---|---|---|
| 4 | 0.6 | 270 | Cold-rolled, non-galvanized, non-skin rated |
| 3 | 0.6 | 270 | Cold-rolled, galvanized (45 g/m$^2$) |
| 2 | 1.6 | 980 | Cold-rolled, galvanized, dual-phase steel |
| 1 | 1.4 | 780 | Cold-rolled, galvanized (60 g/m$^2$) |

In an exemplary application using a stack of sheet metal as configured according to TABLE 3, according to one embodiment, a current profile similar to the current profile 500 of FIG. 5 is utilized. In this exemplary embodiment, the first current pulse 402 is applied for 3 cycles and has a current value of 10.5 kA. The intermediate current pulse 502 is applied for 4 cycles and has a current value of 9.25 kA. A period of cooling time 504 lasts 7 cycles (where no current is applied). The second current pulse 404 is applied for 30 cycles and has a current value of 9.75 kA.

The exemplary stacks of sheet metal 202 described in TABLES 1-3 and the corresponding detailed current profiles are merely examples of applications. The stacks 202 and the current profile can be modified per the teachings disclosed herein to achieve reliable complete welds in mass production settings or otherwise.

So configured, methods and a corresponding apparatus has been described such that a stack of sheet metal having a high stack ratio and/or having four or more individual sheets can be reliably resistively spot welded. The described methods and apparatus allow for an economic, flexible, and efficient resistive spot welding solution that does not require the cost or inconvenience associated with utilizing a specialized welding device and/or with replacing most existing welding equipment.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments of the disclosure.

What is claimed is:

1. A method of resistive spot welding a stack of sheet metal having a stack ratio of at least seven, the method comprising:
contacting a first welding tip to a first side of a stack of sheet metal, wherein the stack of sheet metal includes a plurality of sheets of sheet metal;
contacting a second welding tip to a second side of the stack of sheet metal, wherein the second welding tip includes a contacting surface area less than a contacting surface area of the first welding tip, wherein each of the first welding tip and the second welding tip comprises a spherical welding tip, and wherein the second side of the stack of sheet metal includes a thinnest exterior sheet of the plurality of sheets of sheet metal of the stack of sheet metal;

applying a squeeze pressure to the stack of sheet metal between the first welding tip and the second welding tip; and applying a first current pulse for a first duration followed by a second current pulse having a lower current than the first current pulse for a second duration longer than the first duration to the stack of sheet metal between the first welding tip and the second welding tip to resistively spot weld the stack of sheet metal, wherein a welding nugget is initially formed closer to the second welding tip than the first welding tip.

2. The method of claim 1 wherein applying the first current pulse and the second current pulse to the stack of sheet metal between the first welding tip and the second welding tip further comprises applying a direct current to the stack of sheet metal.

3. The method of claim 1, further comprising performing a tip dressing procedure on the first welding tip and the second welding tip after performing a plurality of spot welding procedures.

4. The method of claim 1, further comprising applying at least one intermediate current pulse to the stack of sheet metal after applying the first current pulse and before applying the second current pulse, wherein the intermediate current pulse is distinguishable from both the first current pulse and the second current pulse by one or more of the following: a current value, a duration of application, and a separation by a gap in time between applications.

5. The method of claim 1, further comprising waiting a period of cooling time after applying the first current pulse to the stack of sheet metal and before applying the second current pulse to the stack of sheet metal.

6. The method of claim 5, wherein waiting a period of cooling time comprises waiting five cycles to nine cycles, wherein one cycle is 1/60th of one second.

7. The method of claim 1, wherein applying the first current pulse comprises applying the first current pulse for the first duration of two cycles to five cycles, wherein one cycle is 1/60th of one second, and wherein applying the second current pulse comprises applying the second current pulse for the second duration of 25 cycles to 35 cycles.

8. The method of claim 7, further comprising: applying at least one intermediate current pulse for a third duration of two cycles to five cycles after applying the first current pulse and before applying the second current pulse.

9. A method of resistively spot welding a stack of sheet metal, the stack of sheet metal including at least four individual sheets of sheet metal and having a stack ratio of seven or higher, the method comprising:

applying a squeeze force to the stack of sheet metal positioned between a first welding tip and a second welding tip, wherein the second welding tip has a contact surface area less than a contact surface area of the first welding tip, each of the first welding tip and the second welding tip comprises a spherical welding tip, and the second welding tip is in direct contact with a thinnest exterior sheet of the stack of sheet metal;

applying a direct current to the stack of sheet metal positioned between the first welding tip and the second welding tip, the first welding tip has a negative polarity and the second welding tip has a positive polarity, wherein applying the direct current to the stack of sheet metal comprises applying a first current pulse for a first duration followed by applying a second current pulse for a second duration at least five times greater than wherein a welding nugget is initially formed closer to the second welding tip than the first welding tip; and dressing the first welding tip and the second welding tip after performing between 80 welding operations and 160 welding operations.

10. The method of claim 9, wherein applying the first current pulse comprises applying the first current pulse for the first duration of two cycles to five cycles, wherein one cycle is 1/60th of one second, and applying the second current pulse comprises applying the second current pulse for the second duration of 25 cycles to 35 cycles.

11. The method of claim 9, further comprising:
applying an intermediate current pulse for a third duration of two cycles to five cycles; and
waiting five cycles to nine cycles of cooling time after applying the intermediate current pulse before applying the second current pulse.

* * * * *